US008857070B2

(12) United States Patent
Niederbremer

(10) Patent No.: US 8,857,070 B2
(45) Date of Patent: Oct. 14, 2014

(54) DEVICE FOR DETERMINING THE ANGULAR POSITION OF A PIVOTABLE COMPRESSOR GUIDE VANE

(75) Inventor: Fabian Niederbremer, Pasadena, TX (US)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 13/515,867

(22) PCT Filed: Dec. 14, 2010

(86) PCT No.: PCT/EP2010/069579
§ 371 (c)(1),
(2), (4) Date: Jun. 14, 2012

(87) PCT Pub. No.: WO2011/073168
PCT Pub. Date: Jun. 23, 2011

(65) Prior Publication Data
US 2012/0249129 A1 Oct. 4, 2012

(30) Foreign Application Priority Data

Dec. 15, 2009 (EP) .................................. 09015520

(51) Int. Cl.
*G01B 5/24* (2006.01)
*G01B 3/56* (2006.01)
*F01D 17/16* (2006.01)
*F01D 21/00* (2006.01)

(52) U.S. Cl.
CPC ... *G01B 5/24* (2013.01); *G01B 3/56* (2013.01); *F01D 17/162* (2013.01); *F01D 21/003* (2013.01)
USPC .............................................. 33/534; 33/1 N

(58) Field of Classification Search
CPC ..................................... G01B 5/24; G01B 3/56
USPC ....................................................... 33/534, 1 N
See application file for complete search history.

(56) References Cited

U.S. PATENT DOCUMENTS

| | | | | |
|---|---|---|---|---|
| 2,546,532 A | * | 3/1951 | Wade | 33/471 |
| 2,912,762 A | * | 11/1959 | Semrau | 33/430 |
| 3,919,776 A | * | 11/1975 | Upton | 33/1 N |
| 4,597,187 A | | 7/1986 | King | |
| 4,718,172 A | | 1/1988 | Partington | |

(Continued)

FOREIGN PATENT DOCUMENTS

| | | |
|---|---|---|
| CN | 87106358 A | 6/1988 |
| EP | 1895267 A1 | 3/2008 |

(Continued)

*Primary Examiner* — Christopher Fulton

(57) ABSTRACT

A device for determining the angular position of a compressor guide vane pivotable about the longitudinal axis thereof disposed in a compressor, associated with a synchronously rotating, flat measuring surface is provided. In order to allow particularly reliable, simple, and nearly error-free detection of the angular positions by means of a robust device, the angular position of the compressor guide vane rotatable about the longitudinal axis thereof is semi-automatically determined by means of the device. To this end, the device includes at least one mounting unit for temporarily fastening the device in alignment on the compressor, and a measuring unit including an angle measuring device having a rotary plate rotatable about the rotary axis, on which rotary plate a vertically protruding measuring arm extending parallel to the rotary axis is provided for making planar contact, via the free end thereof, with the measuring surface.

12 Claims, 3 Drawing Sheets

(56) References Cited

U.S. PATENT DOCUMENTS

| | | | |
|---|---|---|---|
| 6,192,595 B1 * | 2/2001 | Stewart | 33/530 |
| 6,240,646 B1 * | 6/2001 | Ronnmark et al. | 33/1 PT |
| 6,594,913 B1 * | 7/2003 | Reilly | 33/534 |
| 6,766,583 B2 * | 7/2004 | Economaki | 33/534 |
| 7,700,907 B2 | 4/2010 | Braun et al. | |
| 8,607,465 B1 * | 12/2013 | Edwards | 33/471 |
| 8,670,896 B2 * | 3/2014 | Hodorek et al. | 701/33.2 |
| 2005/0079046 A1 | 4/2005 | Plona | |
| 2009/0021247 A1 | 1/2009 | Braun | |
| 2014/0039810 A1 * | 2/2014 | Wener | 702/41 |

FOREIGN PATENT DOCUMENTS

| | | |
|---|---|---|
| FR | 2904669 A1 | 2/2008 |
| JP | 61149802 | 7/1986 |
| JP | 63090701 | 4/1988 |
| JP | 2003287295 A | 10/2003 |
| JP | 2008057533 A | 3/2008 |
| SU | 815466 A1 | 3/1981 |
| SU | 1758405 A1 | 8/1992 |

\* cited by examiner

DEVICE FOR DETERMINING THE ANGULAR POSITION OF A PIVOTABLE COMPRESSOR GUIDE VANE

CROSS REFERENCE TO RELATED APPLICATIONS

This application is the US National Stage of International Application No. PCT/EP2010/069579, filed Dec. 14, 2010 and claims the benefit thereof. The International Application claims the benefits of European Patent Office application No. 09015520.1 EP filed Dec. 15, 2009. All of the applications are incorporated by reference herein in their entirety.

FIELD OF INVENTION

The invention relates to a device for determining the angle position of a compressor guide blade which is arranged in a compressor and which is pivotable about its longitudinal axis and which is assigned a measurement surface which pivots synchronously with said compressor guide blade.

BACKGROUND OF INVENTION

It is known that, during the assembly of compressor guide blades, which are adjustable about their longitudinal axis, and the associated adjusting drive, these are aligned individually with respect to a reference groove arranged on the guide blade carrier by means of a device. This is necessary to ensure that all the blade airfoils of the ring of compressor guide blades always have identical stagger angles in order to ensure a synchronous incident flow at the downstream compressor rotor blades during operation. An asynchronous incident flow at the compressor rotor blades could lead to vibration excitation of individual blade airfoils of the rotor blades. This could, in the worst case, result in damage to the rotor blades. To avoid this undesired and possibly critical operating situation of the compressor, checking of the assembly quality by means of a final measurement of the angle position of all the adjustable guide blades is necessary before the compressor is put into operation.

Until now, the angle position of the guide blades has been measured by means of a universal angle gauge and an auxiliary device from outside the housing of the compressor. The auxiliary device, which was placed on the reference groove on the guide blade carrier, served as a stop for one measurement leg of the angle gauge. The rear side surface of an adjusting lever arranged on the rotatable compressor guide blade served as a stop surface for the second measurement leg of the angle gauge, from which the angle position of the guide blade could then be read off. Owing to the restricted spatial conditions at the compressor, and depending on the circumferential position of the compressor guide blade to be checked, there was the possibility of resulting reading errors and inaccurately placed measurement legs. This was possible in particular if the fitter had to work overhead. As a result of the erroneous inspection, there was the possibility of correctly set guide blades being unnecessarily adjusted into an erroneous position, or of incorrect positions of compressor guide blades not being identified. Overall, this had the possible result of stagger angles of the blade airfoils of rotatable guide blades being set in part non-uniformly as viewed over the circumference. A further source of errors which can lead to slightly asymmetrical setting of compressor guide blades are the tolerances as a result of the use of the auxiliary device.

The angle position may also be measured by means of a transportable but voluminous laser measurement device, as proposed for example in EP 1 895 267 A1. Although the known measurement device operates contactlessly with respect to the measurement surface, in the usually restricted environment this is possible only using a deflecting mirror which, in the rough industrial environment of such machines, has proven to be inadequately robust and thus susceptible to damage. Consequently, the laser measurement device requires relatively careful handling so as not to compromise the availability of the measurement device.

Furthermore, U.S. Pat. No. 4,597,187 discloses a measurement device, which corresponds to the design features of the claims, for measuring the angle of incidence of fixed compressor blades. Said measurement device is mounted on a table in order to be able to measure a preassembled but not yet mounted ring with blade airfoils of the compressor. The measurement device comprises a first contact point which is placed onto the leading edge or trailing edge of the blade airfoil to be checked. A rotatable cam disk with a measurement arm must then be pivoted such that two further contact points arranged on the measurement arm bear against the blade airfoil at the suction side or at the pressure side. The pivot angle of the cam disk is then detected by means of a sensor, which then indicates the angle of incidence of the respective blade airfoil. It is a disadvantage here that the measurement of the angle of incidence takes place directly on the blade airfoil. This makes it necessary to provide access to the blade airfoil for a person. The known device is therefore not suitable for determining the angular position of a compressor guide blade which is arranged in a compressor, and which is pivotable about its longitudinal axis, from the outside.

Similar devices for the direct measurement of the angle of incidence of compressor blades or steam turbine blades are known from SU 815466 and U.S. Pat. No. 4,718,172. Said devices have the same disadvantages as the device known from U.S. Pat. No. 4,597,187.

SUMMARY OF INVENTION

It is therefore an object of the present invention to provide a compact device for the determination, which can be carried out from outside a housing of the compressor, of the angle position of a compressor guide blade which is arranged in a compressor and which is pivotable about its longitudinal axis, which device, while maintaining adequate measurement accuracy, permits easy, robust handling of the device and reliable measurement of the angle position.

The object is achieved by means of a device designed as per the features of the claims.

The invention is based on the realization that reading errors can be avoided even if the measurement of the angle position of the compressor guide blade takes place only semi-automatically. For semi-automatic detection, the device has a measurement unit which is arranged on a holding device and which comprises an angle measurement device with a rotary plate which is rotatable about an axis of rotation, on which rotary plate is arranged a vertically projecting measurement arm which extends parallel to the axis of rotation and which is provided so as to abut areally with its free end against the measurement surface.

The invention is based on detection of the angle position by contact. This is made possible in particular through the provision of commercially available angle measurement devices which detect an angle not by means of two measurement legs which are movable relative to one another, but rather by means of a pivoting or rotational movement of a rotary plate about an axis of rotation. The axis of rotation of the angle measurement device must, for exact determination of the angle position, be aligned parallel to the axis of rotation of the pivotable compressor guide blade. In this way, during a displacement of the measurement surface as a result of the pivoting of the compressor guide blade, for every possible angle position of the compressor guide blade, the measurement arm can always bear areally with its free planar end against the likewise planar measurement surface. For this purpose, the rotary plate must be pivoted to the same extent as the measurement surface, which the angle measurement device then detects and displays as an angle between two positions.

Consequently, the position assumed by a compressor guide blade is transmitted to the device for the determination of the angle position by means of the measurement arm thereof.

The operator of the measurement device must merely ensure that the measurement arm bears areally—without misalignment—against the measurement surface. The detection of the angle position is then performed automatically by the angle measurement device, such that this can, on the whole, be referred to as semi-automatic detection of the angle position of the pivotable compressor guide blade. It is therefore also not necessary to provide a plurality of measurement arms.

Owing to the semi-automated detection of the position of the measurement surface by means of the device, a situation is prevented in which mechanical inaccuracies, such as for example inaccurately placed measurement legs on the auxiliary device or on the adjusting lever, can influence the measurement result.

As a result of the semi-automatic detection, calibration is also dispensed with. Only an alignment of the device remains necessary, wherein this is readily possible by means of a simple alignment device.

The invention is thus based on the realization that a particularly robust device can be attained if it is possible to dispense with the laser sensors and the deflecting mirrors of the device known from the prior art, which is fragile in terms of handling.

A further advantage lies in the direct measurement of the angle position of the measurement surface and therefore in the indirect measurement of the angle of incidence. The angle of incidence of an aerodynamically curved blade airfoil is not detected de facto. In fact, the invention specifies a measurement device which can detect the angle position of an adjustable compressor guide blade from the outside on the basis of a measurement surface arranged there, which measurement surface pivots synchronously with the compressor guide blade assigned thereto. This furthermore has the advantage that the measurement device can be used independently of the aerodynamic contour of the profile of the blade airfoil, whereby it is possible to use one and the same measurement device to detect the angle positions of adjustable compressor guide blades of different rings of blades.

The subclaims relate to advantageous refinements.

The measurement unit is preferably arranged on the holding device via a carriage which is displaceable in a translatory fashion. This makes the overall measurement process easier, because in this way, it is above all made possible for the entire measurement device to be arranged on the outside of the housing of the compressor. After simply correctly aligning the device on the housing, it is then possible, by displacement of the carriage together with the measurement device, for the measurement arm of said measurement device to be placed on the measurement surface such that the free planar end of said measurement arm bears areally against the planar measurement surface. A situation is therefore avoided in which the fixing of the device to the housing and the placement of the measurement arm on the measurement surface must be carried out simultaneously by the operator. This leads to increased measurement accuracy, and to the elimination of measurement errors.

Here, the carriage is expediently displaceable perpendicular to the axis of rotation of the rotary plate.

A particularly compact device can be specified if the holding device is of substantially U-shaped form with two laterally arranged flanks and with a web which connects the two flanks, wherein the carriage is displaceable perpendicular to the flanks and parallel to the web. The flanks are formed in each case as frame-like supports, the free ends of which can in each case be mounted on the compressor or on the outside of the housing of the compressor. The measurement device is thus situated primarily in the imaginary elongation of the axis of rotation of the adjustable guide blade, such that only a very small amount of space is required to the sides of the measurement surface in order to measure the angle position.

Particularly simple handling and operation of the device can be attained if handles for gripping the device with two hands simultaneously are provided on the two web ends or flanks, in such a way that the carriage can be displaced using at least one thumb. The operator preferably holds the device using two hands, whereby the operator, by moving his thumbs simultaneously, can displace the carriage along rails in a particularly simple manner and without misalignment. Depending on accessibility, it is also possible for the device to be held, and the carriage to be operated, with one hand if necessary.

For particularly simple and temporary fastening of the device to a compressor, the holding device has a plurality of magnets, in particular a plurality of permanent magnets. By means of permanent magnets, it is possible in a particularly simple manner for the holding device to be temporarily fastened to the compressor and removed again after measurement has been carried out. The use of magnets likewise facilitates handling of the device when mounting it on the compressor using only one hand. Furthermore, if it is necessary to work overhead, the device is temporarily fixed securely underneath the compressor.

To position the device exactly relative to the compressor and to eliminate erroneous measurement of the angle position owing to an incorrectly aligned device, said device can be fixed, so as to be aligned in a predefined measurement position with respect to a reference element arranged on the compressor, by means of two projections. Here, the reference element is preferably in the form of a circumferential groove into which projections provided on the holding device can be inserted as tongue elements of a tongue and groove connection, that is to say in a positively locking manner. It is thus possible to eliminate the possibility of the device being seated in a twisted state relative to the predefined measurement position. It is preferable for a spring-loaded ball to be provided in each projection, which ball can protrude slightly out of a side wall of the projection. Each ball is supported on one of the two side walls of the circumferential groove and thus presses the opposite surface of the projection against the other of the two side walls of the circumferential groove, resulting in an exact position of the device. The spring-loaded ball is also known under the expression "thrust piece".

To permit particularly simple determination of the angle position of a rotatable compressor guide blade, a reference position of the measurement surface is that position which can be assumed by said measurement surface in which the measurement surface is perpendicular to the machine axis.

The angle position which can be determined by the angle measurement device is preferably displayed digitally by a display. Here, the display shows an angle position of 0° when the measurement surface is situated in its reference position and the device is aligned correctly with respect to the reference element.

To keep the determined angle values available for further use for statistical examination and documentation purposes, these may be stored for example in a buffer memory of the device or in a database. The stored angle values may furthermore be read out of the device via commercially available interfaces.

Consequently, through the use of the mobile device, it is possible for measurement tolerances at guides and erroneous handling of measurement legs to be eliminated. Furthermore, the thrust pieces ensure a precise, reproducible alignment of the device on the housing of the compressor or on the guide blade carrier, wherein the magnets make handling easier and allow the device to be operated by one fitter alone. Reading errors may be eliminated by relatively large digital display of the measurement result.

BRIEF DESCRIPTION OF THE DRAWINGS

The invention will be explained on the basis of four figures, in which.

DETAILED DESCRIPTION OF INVENTION

Figure 1:
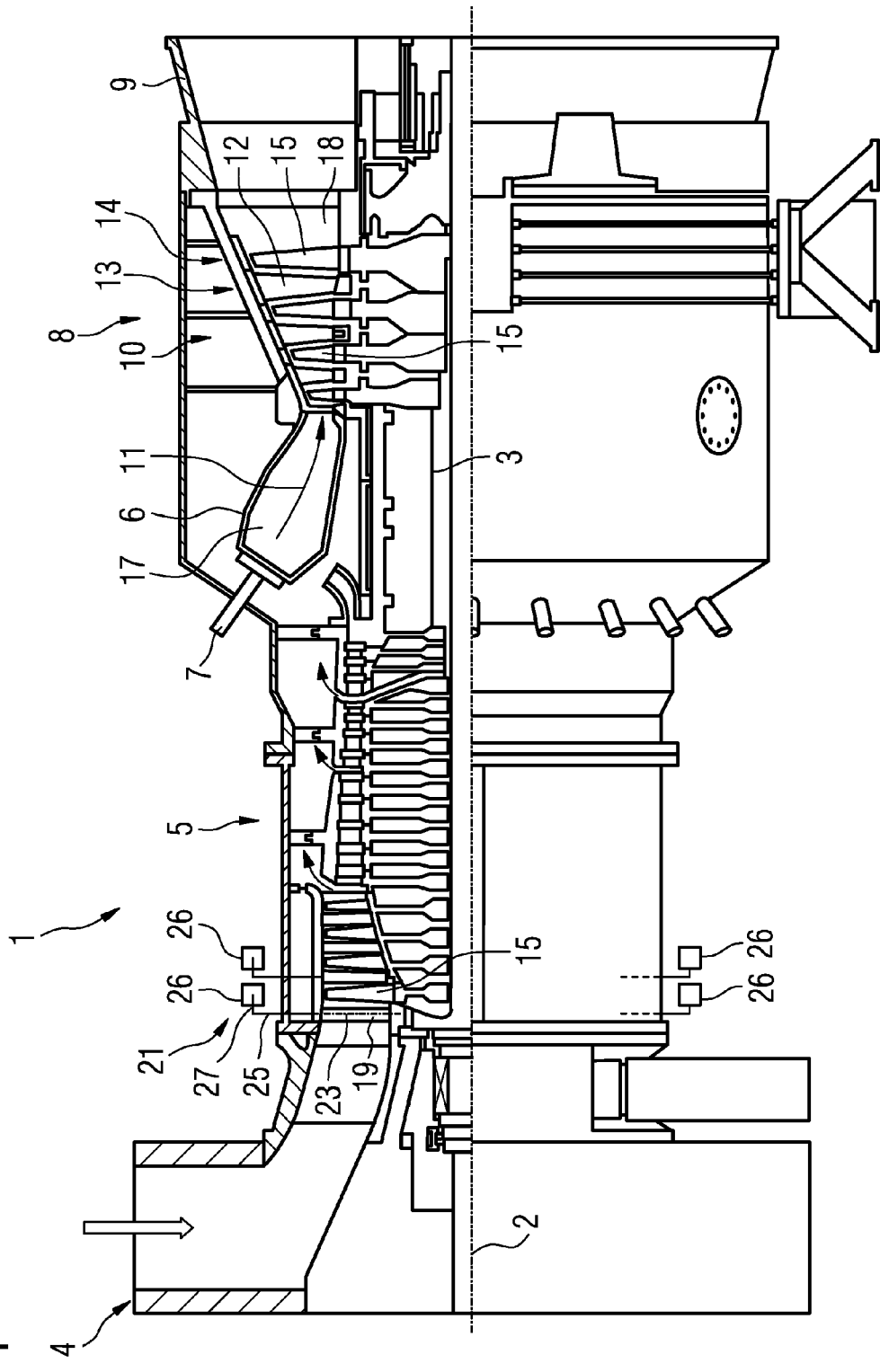
FIG. 1 shows a gas turbine in a longitudinal partial section.

FIG. 1 shows a turbomachine in the form of a gas turbine 1 in a longitudinal partial section. Said gas turbine has, in the interior, a rotor 3 which is mounted so as to rotate about a machine axis 2 and which is also referred to as the turbine rotor. Along the rotor 3 there are arranged, in succession, an intake housing 4, a compressor 5, a toroidal annular combustion chamber 6 with a plurality of burners 7 arranged rotationally symmetrically with respect to one another, a turbine unit 8 and an exhaust-gas housing 9. The annular combustion chamber 6 forms a combustion space 17 which communicates with an annular hot gas duct 18. There, four turbine stages 10 positioned in series form the turbine unit 8. Each turbine stage 10 is formed from two rings of blades. As viewed in the flow direction of a hot gas 11 generated in the annular combustion chamber 6, in the hot gas duct 18, in each case one guide blade row 13 is followed by a row 14 formed from rotor blades 15. The guide blades 12 are fastened to the stator, whereas the rotor blades 15 of a row 14 are attached by means of a turbine disk to the rotor 3. A generator or a working machine (not illustrated) is coupled to the rotor 3.

At the intake-housing-side inlet of the compressor 5 there are provided adjustable compressor guide blades 19. The compressor guide blades 19 are arranged radially in the annular flow duct of the compressor 5 and can be rotated about their respective longitudinal axis 23 by a drive device 21, for example in order to adjust the mass flow passing through the gas turbine 1. Depending on the angle of incidence, also referred to as the stagger angle, it is possible for a particularly large or a small mass flow to pass through the gas turbine 1 as required. To reduce flow losses in the ambient air sucked in, and to prevent vibration excitation of rotor blades 15 which rotate directly downstream of the compressor guide blades 19, which vibration excitation occurs if the rotor blades 15 are impinged on by flow non-uniformly as viewed over the circumference, all of the compressor guide blades 19 are adjusted synchronously by means of the drive device 21 so as to constantly maintain the same angle of incidence.

The drive device 21 is provided outside the flow duct and comprises, in addition to adjusting levers 27 which are assigned to in each case one compressor guide blade 19, an actuating ring 26 which actuates all of the adjustment levers 27 simultaneously and which extends annularly around the compressor 5.

Figure 2:
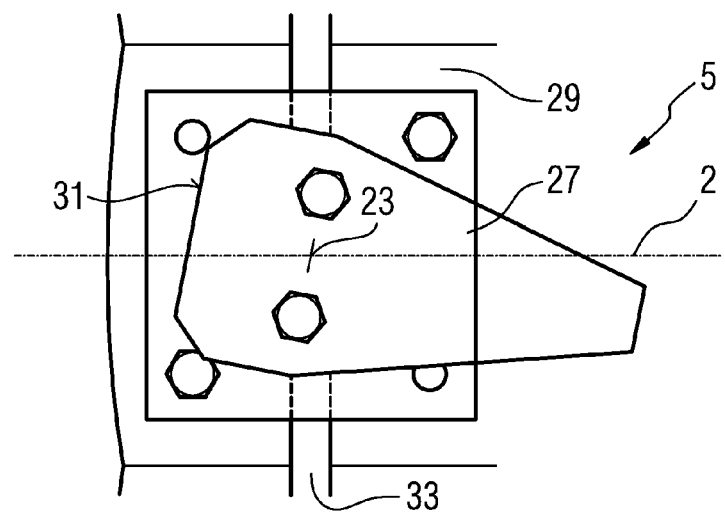
FIG. 2 shows a plan view of a compressor guide blade carrier with an adjustment lever.

FIG. 2 shows the plan view, radially in relation to the machine axis 2, of an adjustment lever 27 for the compressor blade 19 also referred to as an adjustable inlet guide blade (Inlet Guide Vane). Provided between the adjustment lever 27 and the blade airfoil of the compressor blade 19 is the compressor housing 29 or the compressor guide blade carrier. The blade airfoil of the compressor blade 19 and the adjustment lever 27 are rigidly connected to one another and can thus both be rotated or pivoted, always synchronously, about their common longitudinal axis 23.

Figure 3:
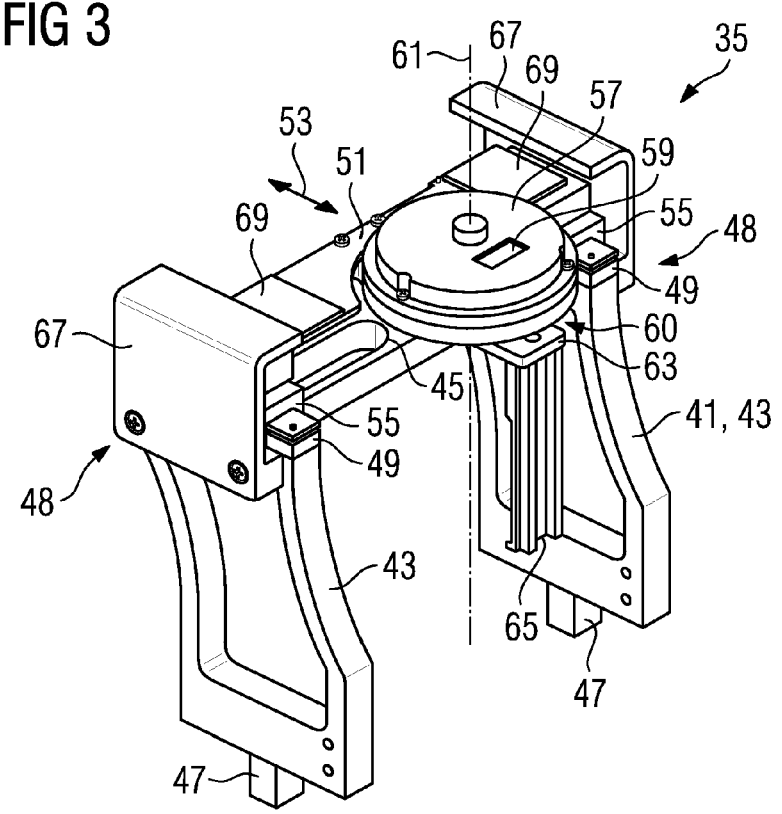
FIG. 3 shows a perspective view of the device for determining the angle position of a compressor guide blade which is pivotable about its longitudinal axis.

To determine the angle position of the compressor guide blades 19 which are arranged in the compressor 5 and which are rotatable about their longitudinal axis 23, there is provided on the adjustment lever 27 a planar measurement surface 31 which rotates synchronously with the compressor guide blade 19 and accordingly with the blade airfoil thereof. The measurement surface 31 is arranged outside the housing 29 or the compressor guide blade carrier. As a result, the stagger angle of the adjustable guide blades can thus be read off from the outside even in the case of a closed housing 29. To determine the angle between any position of the measurement surface 31, which is aligned parallel to the longitudinal axis 23, and the reference position thereof (angle position), the device 35 illustrated in FIG. 3 is provided. Here, the reference position of the measurement surface 31 is that position which can be assumed by the measurement surface 31 in which said measurement surface is perpendicular to the machine axis 2.

The device 35 comprises a holding device 41 with two laterally arranged flanks 43, on the free ends of which are provided a plurality of permanent magnets (not illustrated) for fastening the device 35 to the compressor 5. Furthermore, two projections 47 are screwed to the flanks 43, which projections can be inserted into an encircling circumferential groove 33 (FIG. 2) provided on the compressor guide blade carrier 29. To eliminate the possibility of the device 35 being seated in a twisted state relative to the compressor 5 or the predefined measurement position, it is furthermore provided that spring-loaded, slightly protruding balls as thrust pieces are mounted on the projections 47, which thrust pieces can be supported on a side wall of the circumferential groove 33 (FIG. 2).

The two flanks 43, formed in each case in the manner of a frame, are rigidly connected to one another via a web 45, such that the holding device 41 as a whole has a U-shaped appearance. Arranged on the corners 48 of the holding device 41 is in each case one rail 49, along which a carriage 51 can be displaced in the directions of the double arrow 53. For this purpose, the carriage 51 has, at both ends, sliding blocks 55 which correspond to the profile of the rails 49. An angle measurement device 57 is arranged fixedly on the carriage 51 centrally between the two opposite ends of said carriage. The angle measurement device 57 has a display 59 by means of which an angle can be displayed. The angle measurement device 57 has, on its underside 60 facing toward the flanks 43, a rotary plate 63, which is pivotable about an axis of rotation 61, for the detection of the angle position. A measurement arm 65 projects vertically from the rotary plate 63 and parallel to the axis of rotation 61 thereof and terminates freely.

In principle, the angle measurement device 57 operates in such a way that, in any desired position of the rotary plate 63, the display 59 can be reset to "0°", whereupon subsequently, by rotating the rotary plate 63 about the axis of rotation 61, the corresponding angle of rotation is displayed in the display 59.

Figure 4:
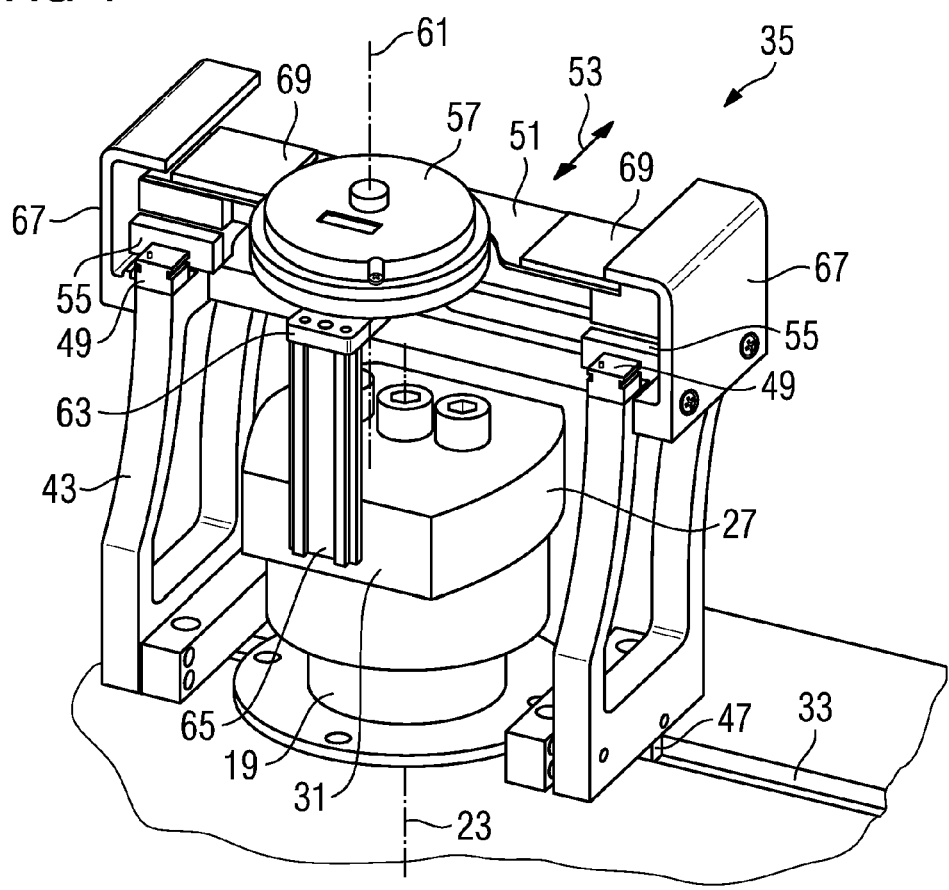
FIG. 4 shows the device for determining the angle position on the compressor of the gas turbine in a measurement position.

FIG. 4 shows the device 35 fastened to the compressor 5 and in its operating position ready for measuring the angle position of the compressor guide blade 19.

The determination of the angle position of the compressor guide blade 19 in relation to the reference position is explained on the basis of FIG. 2.

Before the measurement of the angle position of compressor guide blades of a guide blade ring, the device 35 must be aligned by means of an alignment device (not illustrated in any more detail). The alignment device comprises substantially a seat for holding the device in the predefined measurement position, and a non-adjustable element which has the reference position. Inserted into said element, the free end of the measurement arm is placed areally at the reference position, whereupon the display 59 of the angle measurement device 57 is aligned to zero.

For the subsequent measurement processes, the device 35 will then always display an angle of 0° when the measurement surface 31 of the respective adjustment lever 27 is in the reference position. A rotation of the adjustment lever 27 clockwise will for example be characterized by a positive angle, whereas a rotation of the compressor guide blade 19 counterclockwise is indicated by a negative sign.

For measurement, firstly the device 35 is fixed to the outside of the housing 29 of the compressor or of the guide blade carrier. For this purpose, the projections 47 arranged on the flanks 43 are inserted into the circumferential groove 33 such that the device 35 is situated, aligned without errors with respect to the axis of rotation 23 of the compressor guide blade 19, in the measurement position. The device 35 furthermore comprises two U-shaped profiles which are fastened to the ends 48 and which serve as handles 67 for allowing the device 35 to be held by an operator. As a result, the operator is able to place his thumbs on grip-like contact surfaces 69 of the carriage 51 and displace the latter along the rails 49. During the insertion of the projections 47 into the circumferential groove 33, an operator holds the device 35 by the handles 67 and the surfaces 69 such that the measurement arm 65 initially does not make contact with the measurement surface 31. In this way, it is ensured that the device 35 is aligned correctly, without twisting and therefore in the predefined measurement position relative to the relevant compressor guide blade 19. The operator subsequently displaces the carriage 51 such that the measurement arm 65 makes areal contact with the measurement surface 31. Here, if the measurement surface 31 is twisted relative to its reference position, the measurement arm 65 together with the rotary plate 63 must likewise be pivoted by the same value until the free planar end of said measurement arm then bears areally against the planar measurement surface 31. The measurement device 57 then shows the individual angle position of the respective compressor guide blade in relation to the reference position.

Furthermore, the device 35 may also comprise further means by which the angle positions determinable by said device can be stored and from which the stored angle positions can be read out in order that they can be processed further for statistical calculations.

The device 35 may self-evidently be used not only to detect the angle positions of compressor inlet guide blades but rather also to determine the angle position of those guide blades which are arranged in the upstream stages of an axial compressor and which, in a similar way to the compressor inlet guide blades, are pivotable about their longitudinal axes. If the housing portions of different compressor stages then have different spatial conditions and therefore possibly different reference elements, the device can be adapted through the use of adapter elements that can be screwed onto the flanks 43.

Overall, with the device 35 for determining the angle position of a compressor guide blade 19 which is arranged in a compressor 5 and which is rotatable about its longitudinal axis 23 and which is assigned a planar measurement surface 31 which rotates synchronously with said compressor guide blade, particularly reliable, simple and error-free detection of the angle positions can be carried out. The angle position of the compressor guide blade 19 which is rotatable about its longitudinal axis can be determined in an extremely precise and reproducible manner. For this purpose, the device 35 has at least one holding device 41, which is provided for aligned, temporary fastening of the device 35 to the housing 29 of the compressor 5, and at least one measurement unit which comprises an angle measurement device 57 with a rotary plate 63 which is rotatable about an axis of rotation 61, on which rotary plate 63 a vertically projecting measurement arm 65, which extends parallel to the axis of rotation 61, is arranged so as to abut areally with its free, planar end against the measurement surface 31.

The invention claimed is:

1. A device for determining the angle position of a compressor guide blade arranged in a compressor and is pivotable about its longitudinal axis and includes a measurement surface which pivots synchronously with the compressor guide blade, the device comprising:
   a holding device for temporarily fixing the device to a housing of a compressor from the outside, and
   a measurement unit arranged on the holding device and comprising an angle measurement device with a rotary plate which is rotatable about an axis of rotation, on which rotary plate is arranged a vertically projecting measurement arm,
   wherein the measurement arm extends parallel to the axis of rotation and is provided so as to abut areally with its free end against the measurement surface.

2. The device as claimed in claim 1, wherein the holding device is of U-shaped form with two flanks and with a web which connects the two flanks.

3. The device as claimed in claim 1, wherein the measurement unit is arranged on the holding device via a carriage which is displaceable in a translatory fashion.

4. The device as claimed in claim 3, wherein the carriage is displaceable perpendicular to the axis of rotation of the rotary plate and perpendicular to the flanks and parallel to the web.

5. The device as claimed in claim 3, wherein the carriage is displaceable perpendicular to the axis of rotation of the rotary plate or perpendicular to the flanks and parallel to the web.

6. The device as claimed in claim 3, wherein handles for gripping the device with two hands simultaneously are provided on the two web ends or flanks, in such a way that the carriage is displaced using a thumb.

7. The device as claimed in claim 1, wherein the holding device comprises a plurality of magnets.

8. The device as claimed in claim 7, wherein the holding device comprises a plurality of permanent magnets.

9. The device as claimed in claim 1, wherein the device is fixed, so as to be aligned with respect to a reference element arranged on the compressor, by means of two thrust pieces.

10. The device as claimed in claim 1, wherein the device includes a display for displaying the angle position that may be determined by the evaluating unit.

11. The device as claimed in claim 1, wherein an angle position of 0° is detected when the measurement surface is in a reference position.

12. The device as claimed in claim 1, wherein the determinable angle positions are stored, and from which the stored angle positions may be read out.

* * * * *